US007454354B2

(12) United States Patent
Nomura et al.

(10) Patent No.: US 7,454,354 B2
(45) Date of Patent: Nov. 18, 2008

(54) HIERARCHICAL LOSSLESS ENCODING/DECODING METHOD, HIERARCHICAL LOSSLESS ENCODING METHOD, HIERARCHICAL LOSSLESS DECODING METHOD, ITS APPARATUS AND PROGRAM

(75) Inventors: Toshiyuki Nomura, Tokyo (JP); Yuichiro Takamizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 943 days.

(21) Appl. No.: 10/478,905

(22) PCT Filed: Mar. 24, 2003

(86) PCT No.: PCT/JP03/03513

§ 371 (c)(1),
(2), (4) Date: Nov. 24, 2003

(87) PCT Pub. No.: WO03/081196

PCT Pub. Date: Oct. 2, 2003

(65) Prior Publication Data

US 2004/0161043 A1 Aug. 19, 2004

(30) Foreign Application Priority Data

Mar. 26, 2002 (JP) ............................ 2002-085705

(51) Int. Cl.
*G01L 21/04* (2006.01)
*G01L 19/14* (2006.01)

(52) U.S. Cl. ........................ 704/504; 704/201; 704/211

(58) Field of Classification Search ............ 375/240.27, 375/243; 714/746, 747
See application file for complete search history.

(56) References Cited

U.S. PATENT DOCUMENTS 3,569,934 A * 3/1971 Parr, Jr. ...................... 714/747

(Continued)

FOREIGN PATENT DOCUMENTS

JP H07-015413 * 1/1995

(Continued)

OTHER PUBLICATIONS

Moller, "Quasi Double-Precision in Floating Point Addition", BIT Numerical Mathematics, vol. 5, No. 1, Mar. 1965.*

(Continued)

*Primary Examiner*—David R. Hudspeth
*Assistant Examiner*—Brian L Albertalli
(74) *Attorney, Agent, or Firm*—Scully, Scott, Murphy & Presser PC

(57) ABSTRACT

A hierarchical lossless encoding and decoding technology for digital signals such as of music data, audio data, or the like. A lossless reproduced signal is made identical to an input signal even when the processing accuracy in an encoding apparatus and the processing accuracy in a decoding apparatus are different from each other. the encoding apparatus transmits low-bit-rate encoded data produced by encoding an input signal, lossless encoded data produced by effecting lossless encoding on a differential signal between a low-bit-rate decoded signal decoded from the low-bit-rate encoded data and the input signal, and corrective information extracted from the low-bit-rate decoded signal to respective input terminals of the decoding apparatus. A low-bit-rate decoder decodes the low-bit-rate encoded data. A lossless decoder decodes the differential signal. A corrector corrects the low-bit-rate decoded signal based on the corrective information. An adder adds the differential signal and the corrected low-bit-rate decoded signal into a lossless reproduced signal.

18 Claims, 6 Drawing Sheets

U.S. PATENT DOCUMENTS

| | | | | | |
|---|---|---|---|---|---|
| 4,716,565 | A | * | 12/1987 | Suma | 714/747 |
| 4,803,684 | A | * | 2/1989 | Kozuki et al. | 714/747 |
| 4,888,780 | A | * | 12/1989 | Imazu | 714/747 |
| 5,313,472 | A | * | 5/1994 | Hara | 714/747 |
| 5,781,564 | A | * | 7/1998 | Peterson | 714/747 |
| 6,125,348 | A | | 9/2000 | Levine | |
| 6,598,197 | B1 | * | 7/2003 | Peterson et al. | 714/763 |
| 2001/0050959 | A1 | | 12/2001 | Nishio et al. | |

FOREIGN PATENT DOCUMENTS

| | | | |
|---|---|---|---|
| JP | 8-46517 | A | 2/1996 |
| JP | 9-93132 | A | 4/1997 |
| JP | 11-251917 | A | 9/1999 |
| WO | WO 99/53677 | | 10/1999 |

OTHER PUBLICATIONS

Hans, M. and Schafer, R.W., "Lossless Compression of Digital Audio", *IEEE Signal Processing Magazine*, 18, No. 4: 21-32; (Jul. 2001).

Sugiyama, A., Hazu, F., Masahiro, I., and Nishitani, T., "Adaptive Transform Coding with an Adaptive Block Size (ATC-ABS)", *ICASSP 90*, 2: 1093-1096; (Apr. 1990).

Schroeder, M.R., and Atal, B.S., "Code-Excited Linear Prediction (CELP): High-Quality Speech at Very Low Bit Rates", *ICASSP 85*, 3: 937-940; (Mar. 1985).

* cited by examiner

HIERARCHICAL LOSSLESS ENCODING/DECODING METHOD, HIERARCHICAL LOSSLESS ENCODING METHOD, HIERARCHICAL LOSSLESS DECODING METHOD, ITS APPARATUS AND PROGRAM

TECHNICAL FIELD

The present invention relates to a hierarchical lossless encoding and decoding technology for digital signals such as of music data, audio data, or the like.

BACKGROUND ART

One process for lossless encoding of audio signals such as music signals is a hierarchical lossless encoding process. Data encoded by the hierarchical lossless encoding process is characterized in that it includes low-bit-rate non-lossless encoded data hierarchically as part thereof. A summary of the hierarchical lossless encoding process is described in IEEE Signal Processing Magazine, pp. 21-32, July 2001. The conventional hierarchical lossless encoding and decoding technology will briefly be described below with reference to FIGS. 1 and 2 of the accompanying drawings which show a conventional hierarchical lossless encoding apparatus and a conventional hierarchical lossless decoding apparatus, respectively.

In the conventional hierarchical lossless encoding apparatus shown in FIG. 1, an input signal from input terminal 100 is supplied to low-bit-rate encoder 101 and delay compensator 102. The input signal supplied to low-bit-rate encoder 101 is encoded thereby and is output as low-bit-rate encoded data to output terminal 105 and low-bit-rate decoder 103. Low-bit-rate decoder 103 decodes the supplied low-bit-rate encoded data into a low-bit-rate decoded signal. The input signal supplied to delay compensator 102 is delayed by a time corresponding to a delay caused by the low-bit-rate encoding and decoding process (a processing time required by low-bit-rate encoder 101 and low-bit-rate decoder 103), and thereafter output as a delayed input signal. Lossless encoder 104 encodes a differential signal, which is produced by subtracting the low-bit-rate decoded signal from the delayed input signal, according to a lossless encoding process, and outputs lossless encoded data to output terminal 106.

In the conventional hierarchical lossless decoding apparatus shown in FIG. 2, low-bit-rate encoded data from input terminal 200 is decoded into a low-bit-rate decoded signal by low-bit-rate decoder 201. Lossless encoded data from input terminal 202 is decoded into a differential signal by lossless decoder 203. The low-bit-rate decoded signal is output to output terminal 204, and added to the differential signal from lossless decoder 203, producing a sum signal that is output as a lossless reproduced signal to output terminal 205. The lossless reproduced signal is the same as the input signal insofar as the low-bit-rate decoded signal in the decoding apparatus is identical to the low-bit-rate decoded signal in the encoding apparatus.

The low-bit-rate encoding and decoding process may be a transform encoding and decoding process or a CELP (Code Excited Linear Prediction) encoding and decoding process. The transform encoding and decoding process will not be described in detail below as reference can be made to Proceedings on ICASSP, pp. 1093-1096, April 1990 for details of the transform encoding and decoding process. The CELP encoding and decoding process will not be described in detail below as reference can be made to Proceedings on ICASSP, pp. 937-940, March 1985 for details of the CELP encoding and decoding process. The lossless encoding and decoding process will not be described in detail below as reference can be made to IEEE Signal Processing Magazine, pp. 21-32, July 2001 for details of the lossless encoding and decoding process.

The conventional hierarchical lossless encoding and decoding process is problematic in that if the low-bit-rate decoded signal in the decoding apparatus is not identical to the low-bit-rate decoded signal in the encoding apparatus, then the lossless reproduced signal is not the same as the input signal. This problem occurs primarily when the processing accuracy in the low-bit-rate decoder in the encoding apparatus and the processing accuracy in the low-bit-rate decoder in the decoding apparatus are different from each other. For example, if international standards ISO/IEC 13818-7 (generally known as MPEG-2 AAC) for audio data encoding are used as the low-bit-rate encoding and decoding process, then the processing accuracy in the low-bit-rate decoder is allowed to be of such a level that the decoded signal produced thereby has a decoding error of ±1 at maximum with respect to a reference decoded signal. Therefore, each of the low-bit-rate decoded signals in the encoding apparatus and the decoding apparatus may possibly have a decoding error of ±1 at maximum with respect to the reference decoded signal, and hence the total error of the low-bit-rate decoded signals in the encoding apparatus and the decoding apparatus may possibly reach ±2 at maximum. As a result, it is possible that the lossless reproduced signal derived from the low-bit-rate decoded signal may not be identical to the input signal.

DISCLOSURE OF THE INVENTION

It is an object of the present invention to make a lossless reproduced signal identical to an input signal even when the processing accuracy in a low-bit-rate decoder in an encoding apparatus and the processing accuracy in a low-bit-rate decoder in a decoding apparatus are different from each other.

According to the present invention, there is provided a means for extracting corrective information from a low-bit-rate decoded signal in a hierarchical lossless encoding method of encoding, into lossless encoded data, a differential signal between a low-bit-rate decoded signal which has been produced by encoding an input signal into low-bit-rate encoded data and decoding the low-bit-rate encoded data, and an input signal. There is also provided a means for correcting a low-bit-rate decoded signal based on corrective information into a lossless reproduced signal in a hierarchical lossless decoding method of decoding hierarchical lossless encoded data which include low-bit-rate encoded data and lossless encoded data.

According to the present invention, a corrective information extractor in an encoding apparatus extracts corrective information from a low-bit-rate decoded signal in view of a maximum value that can occur in a low-bit-rate decoder, and a corrector in a decoding apparatus corrects a low-bit-rate decoded signal based on the corrective information. Since the low-bit-rate decoded signal in the encoding apparatus and the low-bit-rate decoded signal in the decoding apparatus are thus made identical to each other, the lossless reproduced signal is made identical to the input signal.

BEST MODE FOR CARRYING OUT THE INVENTION

Figure 3:
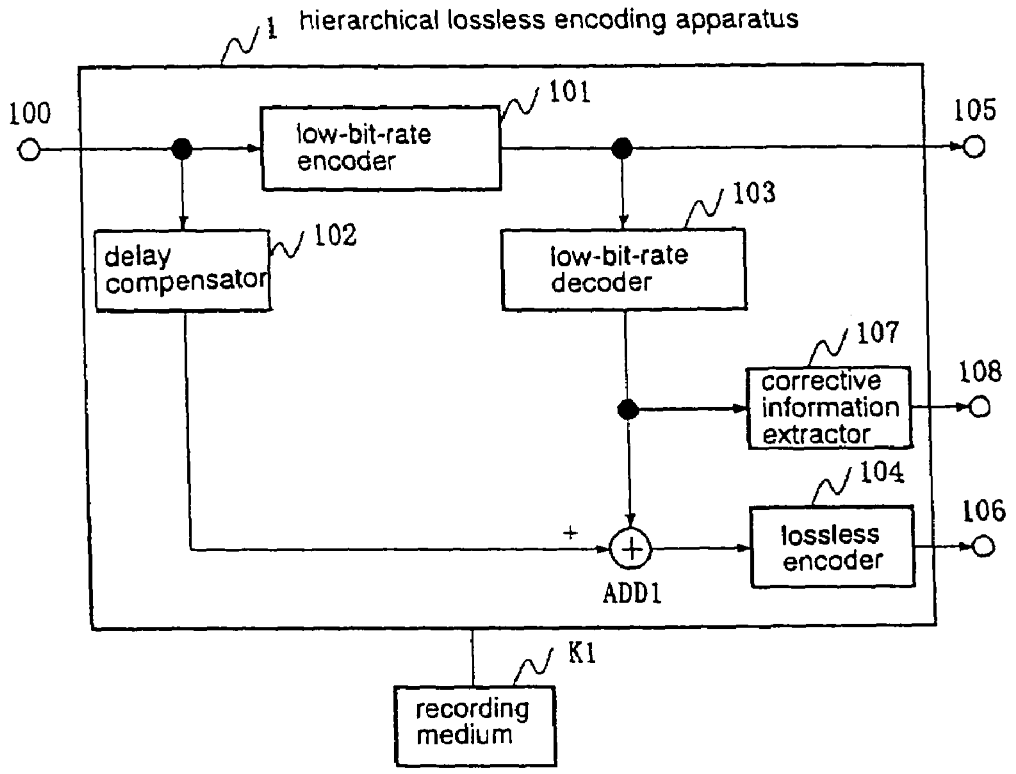
FIG. 3 is a block diagram of a hierarchical lossless encoding apparatus according to a first embodiment of the present invention.

Embodiments of the present invention will be described in detail below with reference to the drawings. FIG. 3 is a block diagram of hierarchical lossless encoding apparatus 1 according to a first embodiment of the present invention, and FIG. 4 is a block diagram of hierarchical lossless decoding apparatus 2 according to the first embodiment of the present invention.

Figure 1:
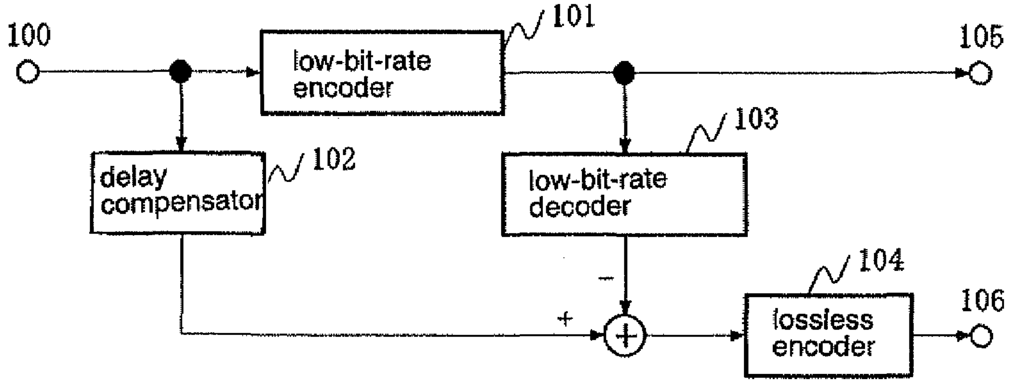
Fig. 1 PRIOR ART
FIG. 1 is a block diagram of a conventional hierarchical lossless encoding apparatus.

As shown in FIG. 3, hierarchical lossless encoding apparatus 1 comprises input terminal 100, low-bit-rate encoder 101, delay compensator 102, low-bit-rate decoder 103, lossless encoder 104, corrective information extractor 107, adder ADD1, output terminals 105, 106, 108, and recording medium K1. Hierarchical lossless encoding apparatus 1 according to the present embodiment differs from the conventional apparatus shown in FIG. 1 in that corrective information extractor 107, output terminal 108, and recording medium K1 are added to the conventional apparatus. Recording medium K1 comprises a disk, a semiconductor memory, or another recording medium, and stores a program for enabling a computer to function as hierarchical lossless encoding apparatus 1. The program is read by the computer and controls its operation to realize low-bit-rate encoder 101, delay compensator 102, low-bit-rate decoder 103, lossless encoder 104, corrective information extractor 107, and adder ADD1 on the computer.

Figure 2:
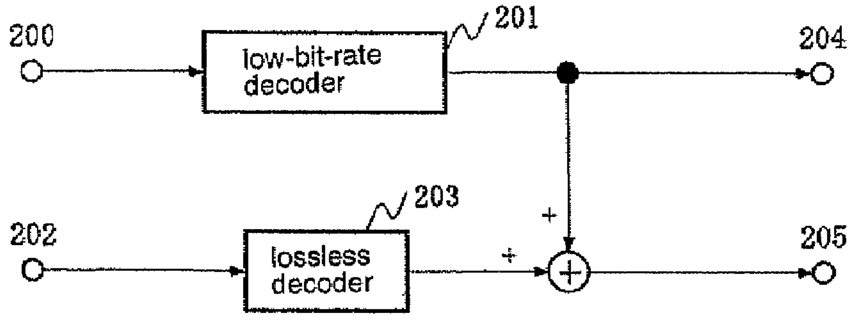
Fig. 2 PRIOR ART
FIG. 2 is a block diagram of a conventional hierarchical lossless decoding apparatus.
Figure 4:
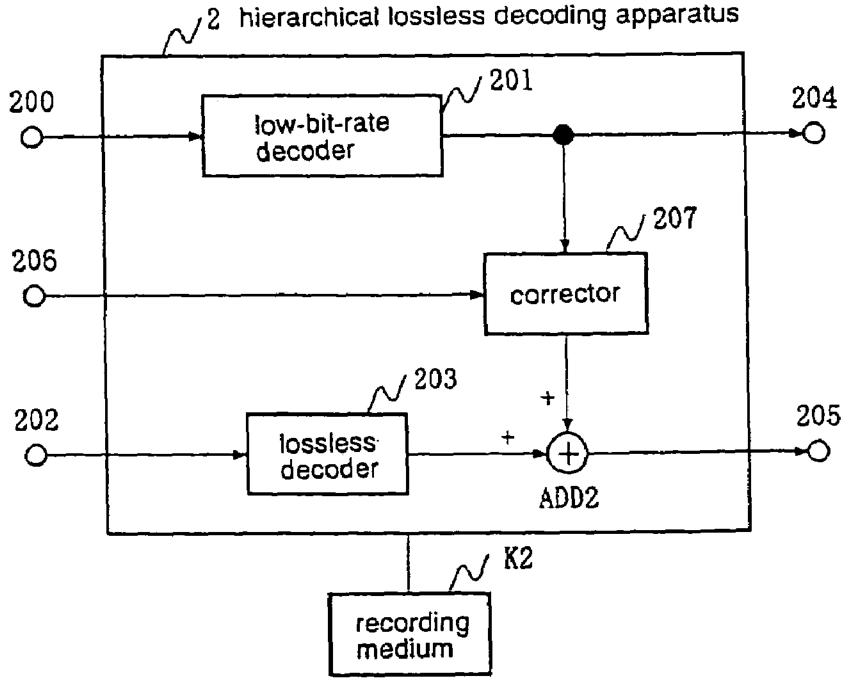
FIG. 4 is a block diagram of a hierarchical lossless decoding apparatus according to the first embodiment of the present invention.

As shown in FIG. 4, hierarchical lossless decoding apparatus 2 comprises input terminals 200, 202, 206, low-bit-rate decoder 201, lossless decoder 203, corrector 207, adder ADD2, output terminals 204, 205, and recording medium K2. Hierarchical lossless decoding apparatus 2 according to the present embodiment differs from the conventional apparatus shown in FIG. 2 in that corrector 207, input terminal 206, and recording medium K2 are added to the conventional apparatus. Recording medium K1 comprises a disk, a semiconductor memory, or another recording medium, and stores a program for enabling a computer to function as hierarchical lossless decoding apparatus 2. The program is read by the computer and controls its operation to realize low-bit-rate decoder 201, lossless decoder 203, corrector 207, and adder ADD2 on the computer.

Operation of the present embodiment will be described below.

Corrective information extractor 107 in hierarchical lossless encoding apparatus 1 extracts corrective information rx in view of a maximum error of low-bit-rate decoder 103 from a low-bit-rate decoded signal that has been calculated by low-bit-rate decoder 103 in the same manner as heretofore, and outputs corrective information rx to output terminal 108. Corrective information rx may employ a value represented by low-order M bits of a sampled value of a low-bit-rate decoded signal. If the absolute value of maximum errors of a low-bit-rate decoded signal in the encoding apparatus and a low-bit-rate decoded signal in the decoding apparatus is represented by E, then M satisfies the following formula:

$$2E+1\leqq 2^{M} \quad (1)$$

If the bit width of the sampled value of the low-bit-rate decoded signal is N bits, then 0<M<N. Though the absolute value E of maximum errors is preset in the present embodiment, the absolute value E may be variable depending on the amplitude of the input signal. If the absolute value E is variable, then the setting information of the absolute value needs to be indicated to the decoding apparatus through a transmitting means or a recording medium. The number M of bits of corrective information rx can be smaller as E is smaller as can be understood from the formula (1). Therefore, the number of transmitted bits can be reduced by making E variable depending on the amplitude of the input signal and transmitting corrective information rx having the number of bits depending on E to the decoding apparatus. Low-bit-rate encoded data, lossless encoded data, and corrective information rx that are output from respective output terminals 105, 106, 108 of hierarchical lossless encoding apparatus 1 are inputted respectively to input terminals 200, 202, 206 of hierarchical lossless decoding apparatus 2.

Figure 5:
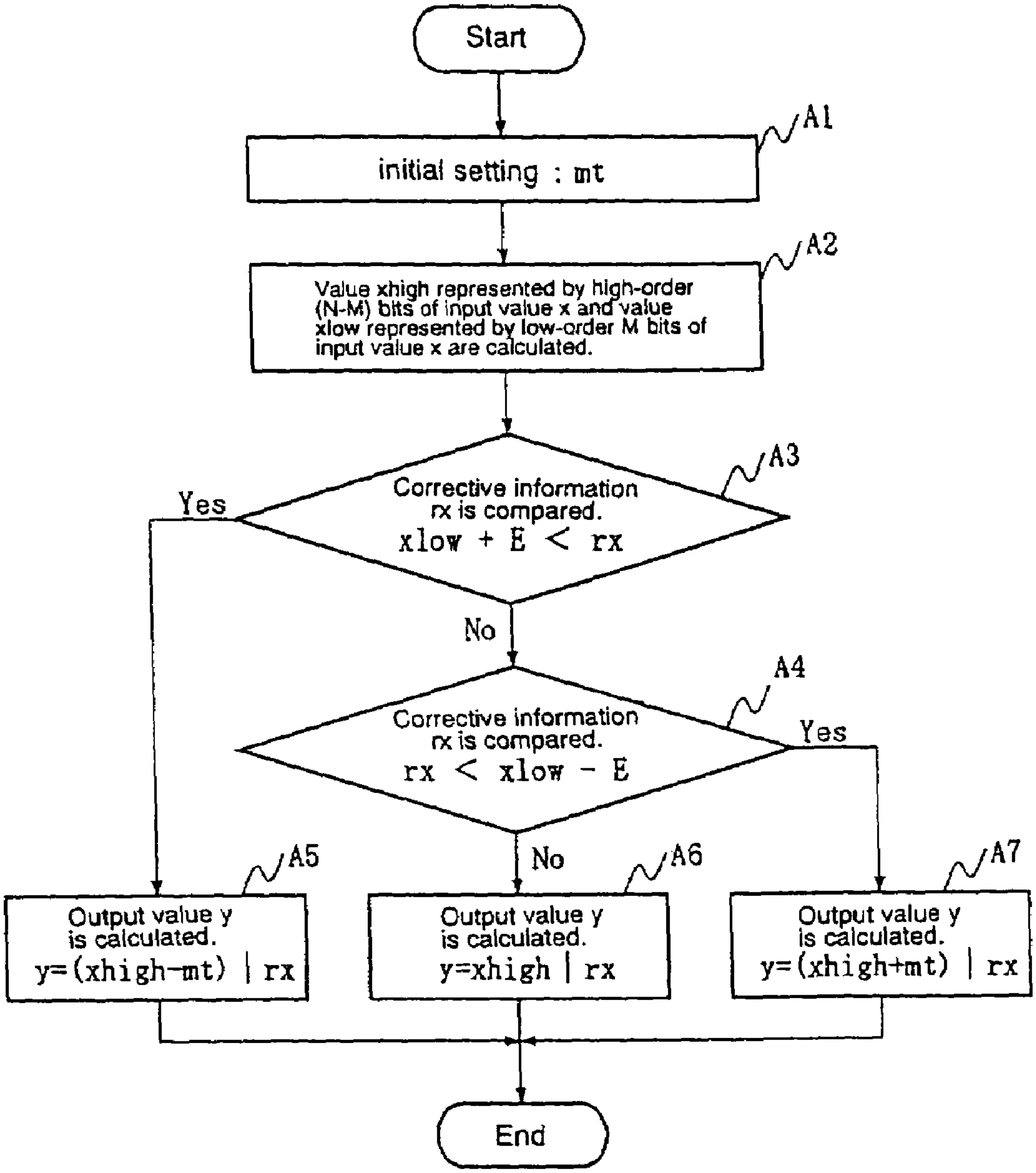
FIG. 5 is a flowchart of a processing sequence of corrector 207.

Corrector 207 of hierarchical lossless decoding apparatus 2 corrects a low-bit-rate decoded signal calculated by low-bit-rate decoder 201 in the same manner as heretofore, based on corrective information rx inputted from input terminal 206, and outputs the corrected low-bit-rate decoded signal. The corrected low-bit-rate decoded signal and a differential signal calculated by lossless decoder in the same manner as heretofore are added to each other by adder ADD2, and the sum is output as a lossless reproduced signal to output terminal 205. Corrector 207 operates per sample of the low-bit-rate decoded signal. An example of operation of corrector 207 will be described in detail below with reference to a flowchart shown in FIG. 5.

As an initial setting, mt is calculated using the low-order bit number M according to the following equation (2) (step A1):

$$\text{mt}=2^{M} \quad (2)$$

Value xhigh represented by high-order (N−M) bits of input value x and value xlow represented by low-order M bits of input value x are calculated according to the following equations (3), (4) (step A2):

$$\text{xhigh}=\text{x}\ \&\ \text{mhigh} \quad (3)$$

$$\text{xlow}=\text{x}\ \&\ \text{mlow} \quad (4)$$

where the symbol "&" represents a logical product for bits. mhigh and mlow are mask patterns, and calculated according to the following equations (5), (6):

$$m\text{high}=-mt \quad (5)$$

$$m\text{low}=mt-1 \quad (6)$$

Value xlow of low-order M bits of the low-bit-rate decoded signal output from low-bit-rate decoder 201 and corrective information rx inputted from input terminal 206 are compared with each other to check if the inequality (7) shown below is satisfied or not (step A3). Specifically, in step A3, it is checked whether or not a carry occurs on the low-order (M+1)th bit of the low-bit-rate decoded signal due to an error.

$$xlow+E<rx \quad (7)$$

If the inequality (7) is satisfied (Yes in step A3), then it is judged that a carry occurs on the low-order (M+1)th bit due to an error, and output value y is calculated according to the following equation (8) (step A5):

$$y=(xhigh-mt)|rx \quad (8)$$

where the symbol "|" represents a logical sum for bits. According to the equation (8), the effect of the carry occurring on the low-order (M+1)th bit is eliminated by xhigh−mt, and the low-order M bits are set to rx, making output value y identical to the low-bit-rate decoded signal in the encoding apparatus.

If the inequality (7) is not satisfied (No in step A3), then it is checked whether the inequality (9) shown below is satisfied or not (step A4). Specifically, in step A4, it is checked whether or not a borrow occurs on the low-order (M+1)th bit due to an error.

$$rx<xlow-E \quad (9)$$

If the inequality (9) is satisfied (Yes in step A4), then it is judged that a borrow occurs on the low-order (M+1)th bit due to an error, and output value y is calculated according to the following equation (10) (step A7):

$$y=(xhigh+mt)|rx \quad (10)$$

According to the equation (10), the effect of the borrow occurring on the low-order (M+1)th bit is eliminated by xhigh+mt, and the low-order M bits are set to rx, making output value y identical to the low-bit-rate decoded signal in the encoding apparatus.

If the inequality (9) is not satisfied (No in step A4), then it is judged that neither carry nor borrow occurs on the low-order (M+1)th bit, and output value y is calculated according to the following equation (11) (step A6):

$$y=xhigh|rx \quad (11)$$

According to the equation (11), the low-order M bits of the low-bit-rate decoded signal are set to corrective information rx, making output value y identical to the low-bit-rate decoded signal in the encoding apparatus. Output value y thus calculated is inputted to one of the input terminals of adder ADD2. Operation of corrector 207 has been described above with reference to FIG. 5.

Using numerical examples of the above correcting process will be described below in relation to corrections according to the equations (8) and (10). If N=16, M=3, E=2, for example, then xlow ranges from 0 to 7, and rx can take 5 (=2E+1) types of values shown in the following table:

| xlow | rx |
|---|---|
| 0 | 0, 1, 2, 6, 7 |
| 1 | 0, 1, 2, 3, 7 |
| 2 | 0, 1, 2, 3, 4 |
| 3 | 1, 2, 3, 4, 5 |
| 4 | 2, 3, 4, 5, 6 |
| 5 | 3, 4, 5, 6, 7 |

-continued

| xlow | rx |
|---|---|
| 6 | 0, 4, 5, 6, 7 |
| 7 | 0, 1, 5, 6, 7 |

For any of combinations of xlow and rx in the above table satisfy the inequality (7) or (9), e.g., for xlow=0, rx=6 or xlow=7, rx=1, the high-order (N−M) bit value xhigh of the low-bit-rate decoded signal in the decoding apparatus is not identical to the high-order (N−M) bit value of the low-bit-rate decoded signal in the encoding apparatus due to the effect of an error ±E. In order to correct the error, the high-order (N−M) bit value xhigh needs to be corrected (xhigh−mt, xhigh+m) according to the equation (8) or the equation (10). Since corrective information rx represents the low-order M bit value of the low-bit-rate decoded signal in the encoding apparatus and the corrected high-order (N−M) bit value is the same as the high-order (N−M) bit value of the low-bit-rate decoded signal in the encoding apparatus, a signal which is the same as the low-bit-rate decoded signal in the encoding apparatus can be reproduced in the decoding apparatus, using corrective information and the corrected high-order (N−M) bit value. Accordingly, even when the processing accuracy in the low-bit-rate decoder in the encoding apparatus and the processing accuracy in the low-bit-rate decoder in the decoding apparatus are different from each other, the present correcting process makes the low-bit-rate decoded signals in the encoding apparatus and the decoding apparatus identical to each other, thus making the lossless reproduced signal identical to the input signal.

Figure 6:
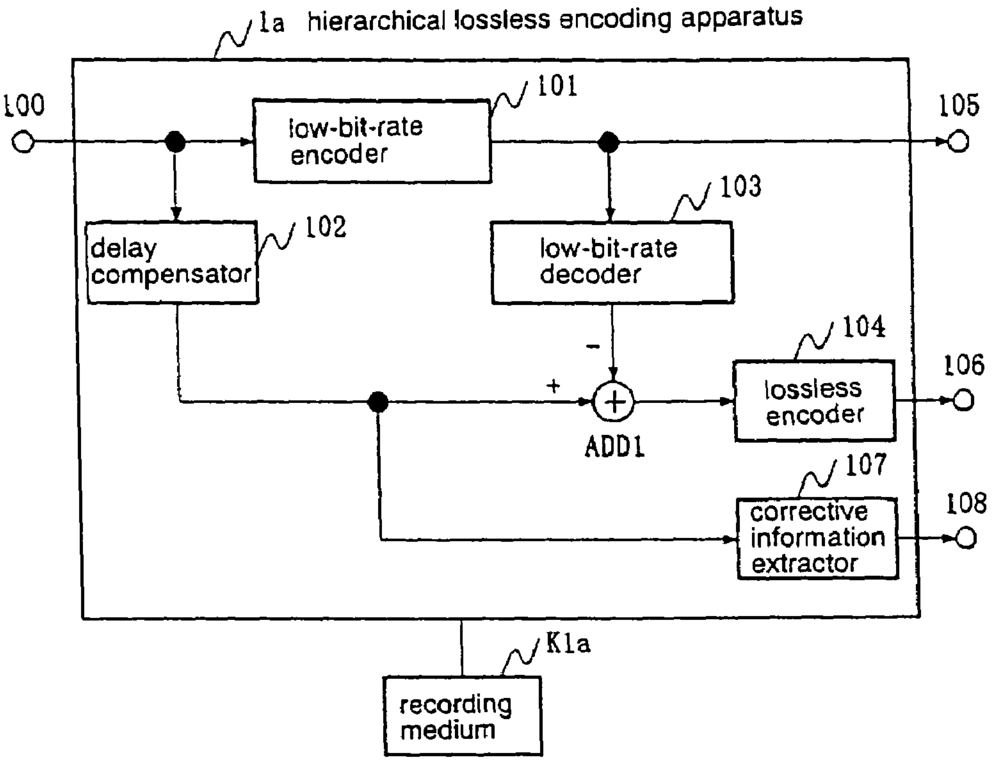
FIG. 6 is a block diagram of a hierarchical lossless encoding apparatus according to a second embodiment of the present invention.

Another embodiment of the present invention will be described below with reference to FIGS. 6 and 7. FIG. 6 is a block diagram of a hierarchical lossless encoding apparatus according to a second embodiment of the present invention, and FIG. 7 is a block diagram of a hierarchical lossless decoding apparatus according to the second embodiment of the present invention.

Hierarchical lossless encoding apparatus 1*a* shown in FIG. 6 differs from hierarchical lossless encoding apparatus 1 shown in FIG. 3 in that the input applied to corrective information extractor 107 is a delayed input signal output from delay compensator 102 and recording medium K1*a* is employed instead of recording medium K1. Recording medium K1*a* stores a program for enabling a computer to function as hierarchical lossless encoding apparatus 1*a*. The program is read by the computer and controls its operation to realize low-bit-rate encoder 101, delay compensator 102, low-bit-rate decoder 103, lossless encoder 104, corrective information extractor 107, and adder ADD1 on the computer.

Figure 7:
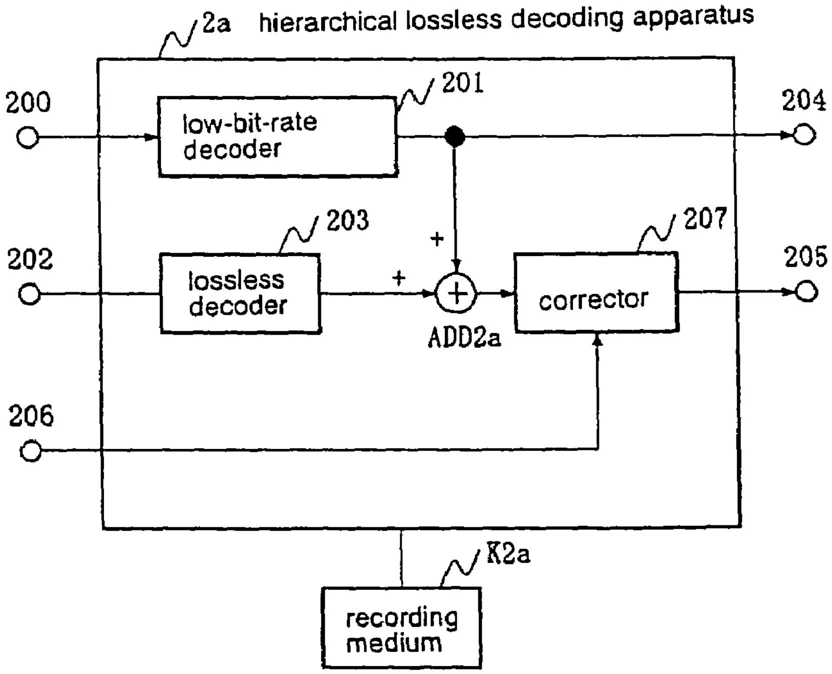
FIG. 7 is a block diagram of a hierarchical lossless decoding apparatus according to the second embodiment of the present invention.

Hierarchical lossless decoding apparatus 2*a* shown in FIG. 7 differs from hierarchical lossless decoding apparatus 2 shown in FIG. 4 in that the input applied to corrector 207 is an output from adder ADD2*a* which adds the output of low-bit-rate decoder 201 and the output of lossless decoder 203 to each other, and recording medium K2*a* is employed instead of recording medium K2. Recording medium K2*a* stores a program for enabling a computer to function as hierarchical lossless decoding apparatus 2*a*. The program is read by the computer and controls its operation to realize low-bit-rate decoder 201, lossless decoder 203, corrector 207, and adder ADD2*a* on the computer.

In hierarchical lossless encoding apparatus 1*a*, corrective information extractor 107 has its input supplied as a delayed input signal calculated by delay compensator 102. Corrective information extractor 107 extracts corrective information (e.g., a value represented by the low-order M bits of the delayed input signal) from the delayed input signal in view of a maximum error that can occur in the low-bit-rate decoded signal calculated by low-bit-rate decoder 103, and outputs the corrective information to output terminal 108.

In hierarchical lossless decoding apparatus 2*a*, corrector 207 corrects a lossless reproduced signal, which is produced by adding the low-bit-rate decoded signal calculated by low-bit-rate decoder 201 and the differential signal calculated by lossless decoder 203, using corrective information supplied through input terminal 206, in the same manner as with the first embodiment, and outputs the corrected lossless reproduced signal. Since the error in the low-bit-rate decoded signal is the same as the error in the lossless reproduced signal, the lossless reproduced signal becomes identical to the input signal when the lossless reproduced signal is corrected. The second embodiment has been described above.

Figure 8:
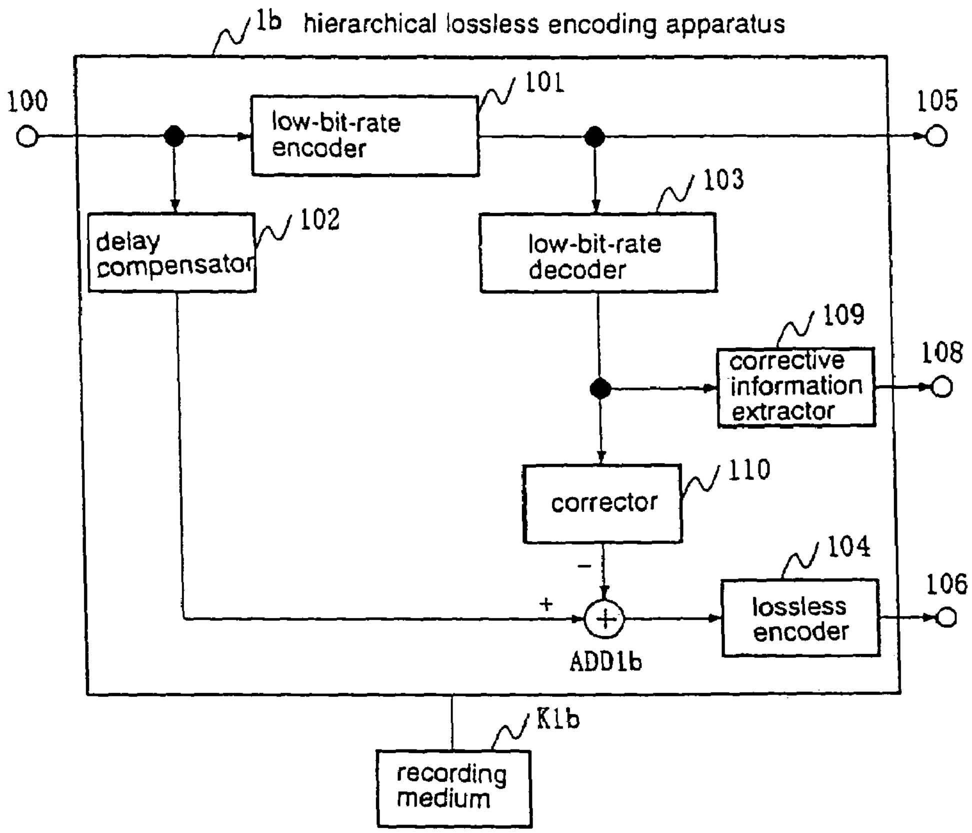
FIG. 8 is a block diagram of a hierarchical lossless encoding apparatus according to a third embodiment of the present invention.

A third embodiment of the present invention will be described in detail below. FIG. 8 is a block diagram of hierarchical lossless encoding apparatus 1*b* according to a third embodiment of the present invention, and FIG. 9 is a block diagram of hierarchical lossless decoding apparatus 2*b* according to the third embodiment of the present invention.

Hierarchical lossless encoding apparatus 1*b* shown in FIG. 8 differs from hierarchical lossless encoding apparatus 1 shown in FIG. 3 in that it has corrector 110, recording medium K1*b* is employed instead of recording medium K1, corrective information extractor 109 is employed instead of corrective information extractor 107, and adder ADD1*b* is employed instead of adder 1. Recording medium K1*b* stores a program for enabling a computer to function as hierarchical lossless encoding apparatus 1*b*. The program is read by the computer and controls its operation to realize low-bit-rate encoder 101, delay compensator 102, low-bit-rate decoder 103, lossless encoder 104, corrective information extractor 109, corrector 110, and adder ADD1*b* on the computer.

Figure 9:
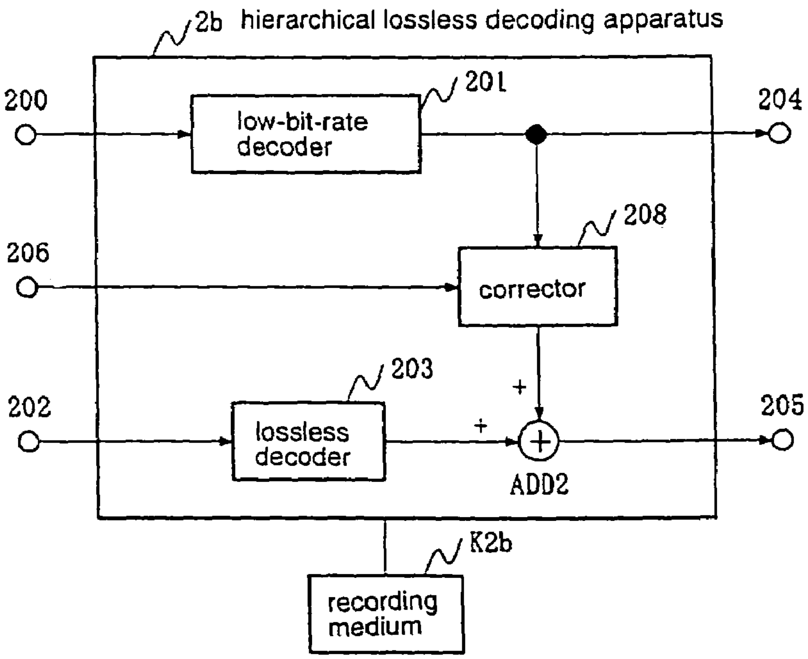
FIG. 9 is a block diagram of a hierarchical lossless decoding apparatus according to the third embodiment of the present invention.

Hierarchical lossless decoding apparatus 2*b* shown in FIG. 9 differs from hierarchical lossless decoding apparatus 2 shown in FIG. 4 in that corrector 208 is employed instead of corrector 207 and recording medium K2*b* is employed instead of recording medium K2. Recording medium K2*b* stores a program for enabling a computer to function as hierarchical lossless decoding apparatus 2*b*. The program is read by the computer and controls its operation to realize low-bit-rate decoder 201, lossless decoder 203, corrector 208, and adder ADD2*a* on the computer.

In hierarchical lossless encoding apparatus 1*b*, corrective information extractor 109 extracts corrective information expressed by a single bit in view of a maximum error from the low-bit-rate decoded signal calculated by the low-bit-rate decoder 103 in the same manner as with the above embodiments, and outputs single-bit corrective information rb to output terminal 108. Single-bit corrective information rb may be, for example, a value represented by the single Mth bit counted from the low-order bit of a sampled value of the low-bit-rate decoded signal. The low-order bit comprises the first bit. M satisfies the above formula (1).

Corrector 110 corrects the low-order M bits of the low-bit-rate decoded signal output from low-bit-rate decoder 103 by applying a 0 mask thereto, and outputs the corrected low-bit-rate decoded signal.

Adder ADD1*b* outputs a differential signal representing the difference between the delayed input signal and the corrected low-bit-rate decoded signal. The output differential signal is encoded by lossless encoder 104, which outputs lossless encoded data to output terminal 106.

In hierarchical lossless decoding apparatus 2*b*, corrector 208 corrects the low-bit-rate decoded signal calculated by the low-bit-rate decoder 201 in the same manner as with the above embodiments, based on single-bit corrective information rb, and outputs the corrected low-bit-rate decoded signal. The corrected low-bit-rate decoded signal is added to a differential signal calculated by lossless decoder 203 in the same manner as with the above embodiments, and outputs the sum signal as a lossless reproduced signal to output terminal 205.

Figure 10:
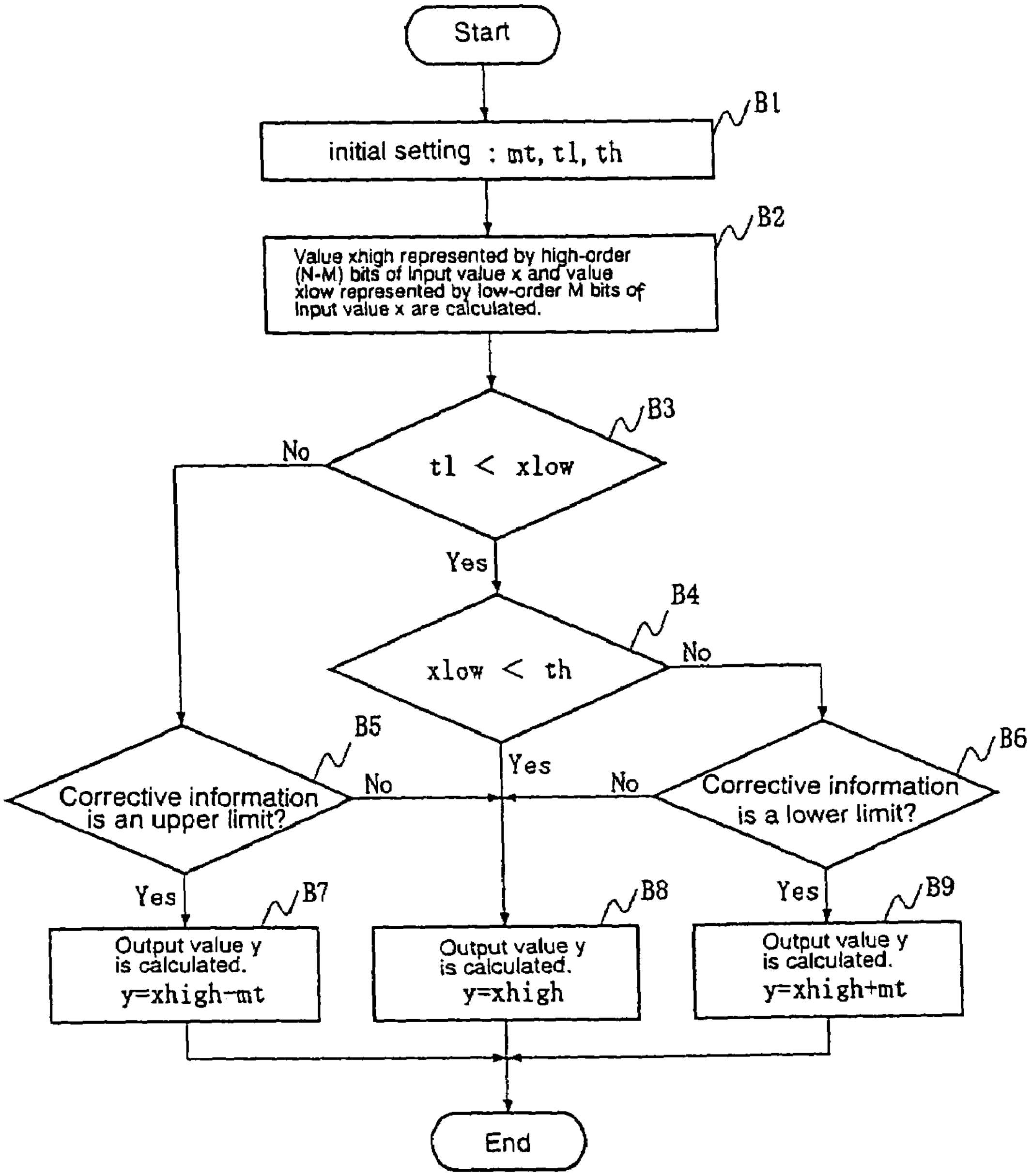
FIG. 10 is a flowchart of a processing sequence of corrector 208.

An example of operation of corrector 208 will be described in detail below with reference to a flowchart shown in FIG. 10.

As initial settings, $$mt=2^M,$$

$$t1=E-1, \text{ and}$$

$$th=mt-E$$

are calculated using the low-order bit number M and the maximum error E (step B1).

Value xhigh represented by high-order (N−M) bits of input value x and value xlow represented by low-order M bits of input value x are calculated in the same manner as in step A2 in the above embodiments (step B2).

Then, value xlow represented by low-order M bits is compared with threshold value t1 to check if the inequality (12) shown below is satisfied or not (step B3). Specifically, it is checked whether or not a carry occurs on the low-order (M+1)th bit due to an error.

$$t1<x\text{low} \tag{12}$$

If the inequality (12) is not satisfied, then since there is a possibility that a carry occurs on the low-order (M+1)th bit, it is checked whether single-bit corrective information rb is an upper limit ("1") or not (step B5).

If single-bit corrective information rb is "1" (Yes in step B5), then it is judged that a carry occurs on the low-order (M+1)th bit, and output value y is calculated according to the equation (13) shown below (step B7). Specifically, in step B7, the effect of the carry due to an error is eliminated.

$$y=x\text{high}-mt \tag{13}$$

If single-bit corrective information rb is "0" (No in step B5), then it is judged that neither carry nor borrow occurs on the low-order (M+1)th bit, and output value y is calculated according to the equation (14) shown below (step B8). Specifically, in step B8, a signal produced by setting all the low-order M bits of the low-bit-rate decoded signal output from low-bit-rate. decoder 201 to "0" is output.

$$y=x\text{high} \tag{14}$$

If the answer to step B3 is Yes, then it is checked whether the inequality (15) shown below is satisfied or not (step B4). That is, it is checked whether or not there is a possibility that a borrow occurs on the low-order (M+1)th bit due to an error.

$$x\text{low}<th \tag{15}$$

If the inequality (15) is not satisfied, then since there is a possibility that a borrow occurs on the low-order (M+1)th bit, it is checked whether single-bit corrective information rb is a lower limit ("0") or not (step B6).

If single-bit corrective information rb is "0"), then it is judged that a borrow occurs, and output value y is calculated according to the equation (16) shown below (step B9). Specifically, in step B9, the effect of the borrow is eliminated.

$$y=x\text{high}+mt \tag{16}$$

If single-bit corrective information rb is "1" (No in step B6), then it is judged that neither carry nor borrow occurs on the low-order (M+1)th bit, and output value y is calculated according to the equation (14) (step B8). Operation of corrector 208 has been described above with. reference to FIG. 10.

In steps B7, B9, xhigh is corrected for the reasons that as with the first and second embodiments, the high-order (N−M) bit value xhigh of the corrected low-bit-rate decoded signal in the decoding apparatus is not identical to the high-order (N−M) bit value xhigh of the corrected low-bit-rate decoded signal in the encoding-apparatus due to the effect of an error ±E. According to the present correcting process, the corrected low-bit-rate decoded signals in the encoding apparatus and the decoding apparatus are made identical to each other, thus making the lossless reproduced signal identical to the input signal.

The number of bits of corrective information rx in the first and second embodiments, varies depending on maximum error E. According to the third embodiment, the number of bits of corrective information rx is 1 at all times independently of maximum error E, and hence the number of bits required for transmitting the corrective information is reduced.

According to the present invention, as described in detail above, the corrective information extractor in the encoding apparatus extracts corrective information in view of a maximum error that can occur in the low-bit-rate decoder from the low-bit-rate decoded signal, and the corrector in the decoding apparatus corrects the low-bit-rate decoded signal based on the corrective information. Therefore, the low-bit-rate decoded signal in the encoding apparatus and the low-bit-rate decoded signal in the decoding apparatus are made identical to each other, thus making the lossless reproduced signal identical to the input signal.

The invention claimed is:

1. A hierarchical lossless encoding and decoding method comprising the steps of:

in an encoding apparatus, encoding an input signal into low-bit-rate encoded data and transmitting the low-bit-rate encoded data to a decoding apparatus;

encoding a differential signal between a low-bit-rate decoded signal produced by decoding said low-bit-rate encoded data and said input signal, into lossless encoded data, and transmitting the lossless encoded data to the decoding apparatus; and extracting corrective information from said low-bit-rate decoded signal and transmitting the corrective information to the decoding apparatus;

in the decoding apparatus, decoding the low-bit-rate encoded data transmitted from the encoding apparatus into a low-bit-rate decoded signal;

decoding the lossless encoded data transmitted from the encoding apparatus into a differential signal; and correcting said low-bit-rate decoded signal based on the corrective information transmitted from said encoding apparatus, and adding the corrected low-bit-rate decoded signal and said differential signal into a lossless reproduced signal.

2. A hierarchical lossless encoding and decoding method according to claim 1, wherein the corrective information extracted from said low-bit-rate decoded signal represents low-order M bits of said low-bit-rate decoded signal, and said step of correcting said low-bit-rate decoded signal comprises the steps of:

determining whether a carry or a borrow occurs on a low-order (M+1)th bit of said low-bit-rate decoded signal based on said corrective information and said low-bit-rate decoded signal;

if a carry occurs, subtracting "1" from the low-order (M+1) th bit of said low-bit-rate decoded signal and replacing the low-order M bits with said corrective information;

if a borrow occurs, adding "1" to the low-order (M+1)th bit of said low-bit-rate decoded signal and replacing the low-order M bits with said corrective information; and if neither carry nor borrow occurs, replacing the low-order M bits of said low-bit-rate decoded signal with said corrective information.

3. A hierarchical lossless encoding and decoding method comprising the steps of:

in an encoding apparatus, encoding an input signal into low-bit-rate encoded data and transmitting the low-bit-rate encoded data to a decoding apparatus;

encoding a differential signal between a low-bit-rate decoded signal produced by decoding said low-bit-rate encoded data and said input signal, into lossless encoded data, and transmitting the lossless encoded data to the decoding apparatus; and extracting corrective information from said input signal and transmitting the corrective information to the decoding apparatus;

in the decoding apparatus, decoding the low-bit-rate encoded data transmitted from the encoding apparatus into a low-bit-rate decoded signal;

decoding the lossless encoded data transmitted from the encoding apparatus into a differential signal;

adding said low-bit-rate decoded signal and said differential signal into a lossless reproduced signal; and correcting said lossless reproduced signal based on said corrective information.

4. A hierarchical lossless encoding and decoding method according to claim 3, wherein the corrective information extracted from said input signal represents low-order M bits of said input signal, and said step of correcting said lossless reproduced signal comprises the steps of:

determining whether a carry or a borrow occurs on a low-order (M+1)th bit of said lossless reproduced signal based on said corrective information and said lossless reproduced signal;

if a carry occurs, subtracting "1" from the low-order (M+1) th bit of said lossless reproduced signal and replacing the low-order M bits with said corrective information;

if a borrow occurs, adding "1" to the low-order (M+1 )th bit of said lossless reproduced signal and replacing the low-order M bits with said corrective information; and if neither carry nor borrow occurs, replacing the low-order M bits of said lossless reproduced signal with said corrective information.

5. A hierarchical lossless encoding and decoding method comprising the steps of:

in an encoding apparatus, encoding an input signal into low-bit-rate encoded data and transmitting the low-bit-rate encoded data to a decoding apparatus;

decoding said low-bit-rate encoded data into a low-bit-rate decoded signal, extracting corrective information from said low-bit-rate decoded signal, and transmitting the corrective information to the decoding apparatus; and encoding a differential signal between a corrected low-bit-rate decoded signal produced by correcting said low-bit-rate decoded signal and said input signal, into lossless encoded data, and transmitting the lossless encoded data to the decoding apparatus;

in the decoding apparatus, decoding the low-bit-rate encoded data transmitted from the encoding apparatus into a low-bit-rate decoded signal;

decoding the lossless encoded data transmitted from the encoding apparatus into a differential signal; and correcting said low-bit-rate decoded signal based on said corrective information, and adding the corrected low-bit-rate decoded signal to said differential signal.

6. A hierarchical lossless encoding and decoding method according to claim 5, wherein the corrective information extracted from said low-bit-rate decoded signal represents low-order M bits of said low-bit-rate decoded signal, said low-bit-rate decoded signal is corrected in said encoding apparatus by:

applying a 0 mask to the low-order M bits;

and said step of correcting said low-bit-rate decoded signal in said decoding apparatus comprises the steps of:

determining whether a carry or a borrow occurs on a low-order (M+1)th bit of said low-bit-rate decoded signal based on said corrective information and said low-bit-rate decoded signal;

if a carry occurs, subtracting “1”from the low-order (M+1) th bit of said low-bit-rate decoded signal and setting all the low-order M bits to “0”;

if a borrow occurs, adding “1” to the low-order (M+1)th bit of said low-bit-rate decoded signal and setting all the low-order M bits to “0”; and if neither carry nor borrow occurs, setting all the low-order M bits of said low-bit-rate decoded signal to “0”.

7. A hierarchical lossless encoding method comprising the steps of:

encoding an input signal into low-bit-rate encoded data;

decoding said low-bit-rate encoded data into a low-bit-rate decoded signal;

encoding a differential signal between said low-bit-rate decoded signal and said input signal into lossless encoded data; and extracting corrective information only from said low-bit-rate decoded signal.

8. A hierarchical lossless encoding method comprising the steps of:

encoding an input signal into low-bit-rate encoded data;

decoding said low-bit-rate encoded data into a low-bit-rate decoded signal;

encoding a differential signal between said low-bit-rate decoded signal and said input signal into lossless encoded data; and extracting corrective information only from said input signal.

9. A hierarchical lossless encoding method comprising the steps of:

encoding an input signal into low-bit-rate encoded data;

decoding said low-bit-rate encoded data into a low-bit-rate decoded signal;

extracting corrective information only from said low-bit-rate decoded signal; and encoding a differential signal between a corrected low-bit-rate decoded signal produced by correcting said low-bit-rate decoded signal and said input signal, into lossless encoded data.

10. A hierarchical lossless encoding and decoding apparatus comprising an encoding apparatus and a decoding apparatus, said encoding apparatus comprising:

a low-bit-rate encoder for encoding an input signal into low-bit-rate encoded data and transmitting the low-bit-rate encoded data to the decoding apparatus;

a low-bit-rate decoder for decoding said low-bit-rate encoded data into a low-bit-rate decoded signal and outputting the low-bit-rate decoded signal;

a lossless encoder for encoding a differential signal between the low-bit-rate decoded signal output from said low-bit-rate decoder and said input signal, into lossless encoded data, and transmitting the lossless encoded data to the decoding apparatus; and a corrective information extractor for extracting corrective information from said low-bit-rate decoded signal and transmitting the corrective information to the decoding apparatus;

said decoding apparatus comprising:

a low-bit-rate decoder for decoding the low-bit-rate encoded data transmitted from said encoding apparatus into a low-bit-rate decoded signal;

a lossless decoder for decoding the lossless encoded data transmitted from said encoding apparatus into a differential signal;

a corrector for correcting said low-bit-rate decoded signal based on the corrective information transmitted from said encoding apparatus; and an adder for adding the low-bit-rate decoded signal corrected by said corrector and said differential signal into a lossless reproduced signal.

11. A hierarchical lossless encoding and decoding apparatus comprising an encoding apparatus and a decoding apparatus, said encoding apparatus comprising:

a low-bit-rate encoder for encoding an input signal into low-bit-rate encoded data and transmitting the low-bit-rate encoded data to the decoding apparatus;

a low-bit-rate decoder for decoding said low-bit-rate encoded data into a low-bit-rate decoded signal and outputting the low-bit-rate decoded signal;

a lossless encoder for encoding a differential signal between the low-bit-rate decoded signal output from said low-bit-rate decoder and said input signal, into lossless encoded data, and transmitting the lossless encoded data to the decoding apparatus; and a corrective information extractor for extracting corrective information from said input signal and transmitting the corrective information to the decoding apparatus;

said decoding apparatus comprising:

a low-bit-rate decoder for decoding the low-bit-rate encoded data transmitted from said encoding apparatus into a low-bit-rate decoded signal;

a lossless decoder for decoding the lossless encoded data transmitted from said encoding apparatus into a differential signal;

an adder for adding said low-bit-rate decoded signal and said differential signal into a lossless reproduced signal; and a corrector for correcting said lossless reproduced signal based on said corrective information.

12. A hierarchical lossless encoding and decoding apparatus comprising an encoding apparatus and a decoding apparatus, said encoding apparatus comprising:

a low-bit-rate encoder for encoding an input signal into low-bit-rate encoded data and transmitting the low-bit-rate encoded data to the decoding apparatus;

a low-bit-rate decoder for decoding said low-bit-rate encoded data into a low-bit-rate decoded signal;

a corrective information extractor for extracting corrective information from said low-bit-rate decoded signal and transmitting the corrective information to the decoding apparatus; and a lossless encoder for encoding a differential signal between a corrected low-bit-rate decoded signal produced by correcting the low-bit-rate decoded signal and said input signal, into lossless encoded data, and transmitting the lossless encoded data to the decoding apparatus; and said decoding apparatus comprising:

a low-bit-rate decoder for decoding the low-bit-rate encoded data transmitted from said encoding apparatus into a low-bit-rate decoded signal;

a lossless decoder for decoding the lossless encoded data transmitted from said encoding apparatus into a differential signal; and a corrector for correcting said low-bit-rate decoded signal based on said corrective information, and adding the corrected low-bit-rate decoded signal to said differential signal.

13. A hierarchical lossless encoding apparatus comprising:

a low-bit-rate encoder for encoding an input signal into low-bit-rate encoded data;

a low-bit-rate decoder for decoding said low-bit-rate encoded data into a low-bit-rate decoded signal;

a lossless encoder for encoding a differential signal between the low-bit-rate decoded signal and said input signal, into lossless encoded data; and a corrective information extractor for extracting corrective information only from said low-bit-rate decoded signal.

14. A hierarchical lossless encoding apparatus comprising:

a low-bit-rate encoder for encoding an input signal into low-bit-rate encoded data;

a low-bit-rate decoder for decoding said low-bit-rate encoded data into a low-bit-rate decoded signal;

a lossless encoder for encoding a differential signal between the low-bit-rate decoded signal and said input signal, into lossless encoded data; and a corrective information extractor for extracting corrective information only from said input signal.

15. A hierarchical lossless encoding apparatus comprising:

a low-bit-rate encoder for encoding an input signal into low-bit-rate encoded data;

a low-bit-rate decoder for decoding said low-bit-rate encoded data into a low-bit-rate decoded signal;

a corrective information extractor for extracting corrective information only from said low-bit-rate decoded signal;

a corrector for correcting said low-bit-rate decoded signal and outputting the corrected low-bit-rate decoded signal; and a lossless encoder for encoding a differential signal between the corrected low-bit-rate decoded signal and said input signal, into lossless encoded data.

16. A hierarchical lossless encoding and decoding apparatus having a computer readable medium having a computer program for enabling a computer to perform the steps of:

in an encoding apparatus, encoding an input signal into low-bit-rate encoded data and transmitting the low-bit-rate encoded data to a decoding apparatus;

decoding said low-bit-rate encoded data into a low-bit-rate decoded signal;

encoding a differential signal between said low-bit-rate decoded signal and said input signal into lossless encoded data, and transmitting the lossless encoded data to the decoding apparatus; and extracting corrective information from said low-bit-rate decoded signal and transmitting the corrective information to the decoding apparatus;

in the decoding apparatus, decoding said low-bit-rate encoded data transmitted from the encoding apparatus into a low-bit-rate decoded signal;

decoding said lossless encoded data transmitted from the encoding apparatus into a differential signal; and correcting said low-bit-rate decoded signal based on said corrective information transmitted from said encoding apparatus, and adding the corrected low-bit-rate decoded signal and said differential signal into a lossless reproduced signal.

17. A hierarchical lossless encoding and decoding apparatus having a computer readable medium having a computer program for enabling a computer to perform the steps of:

in an encoding apparatus, encoding an input signal into low-bit-rate encoded data and transmitting the low-bit-rate encoded data to a decoding apparatus;

decoding said low-bit-rate encoded data into a low-bit-rate decoded signal;

encoding a differential signal between said low-bit-rate decoded signal and said input signal into lossless encoded data and transmitting the lossless encoded data to the decoding apparatus; and extracting corrective information from said input signal and transmitting the corrective information to the decoding apparatus;

in the decoding apparatus, decoding said low-bit-rate encoded data transmitted from the encoding apparatus into a low-bit-rate decoded signal;

decoding said lossless encoded data transmitted from the encoding apparatus into a differential signal;

adding said low-bit-rate decoded signal and said differential signal into a lossless reproduced signal; and correcting said lossless reproduced signal based on said corrective information.

18. A hierarchical lossless encoding and decoding apparatus having a computer readable medium having a computer program for enabling a computer to perform the steps of:

in an encoding apparatus, encoding an input signal into low-bit-rate encoded data and transmitting the low-bit-rate encoded data to a decoding apparatus;

decoding said low-bit-rate encoded data into a low-bit-rate decoded signal;

extracting corrective information from said low-bit-rate decoded signal and transmitting the corrective information to the decoding apparatus; and encoding a differential signal between a corrected low-bit-rate decoded signal produced by correcting said low-bit-rate decoded signal and said input signal, into lossless encoded data and transmitting the lossless encoded data to the decoding apparatus;

in the decoding apparatus, decoding said low-bit-rate encoded data transmitted from the encoding apparatus into a low-bit-rate decoded signal;

decoding said lossless encoded data transmitted from the encoding apparatus into a differential signal; and correcting said low-bit-rate decoded signal based on said corrective information, and adding the corrected low-bit-rate decoded signal to said differential signal.

* * * * *